(12) United States Patent
Aarnio-Winterhof et al.

(10) Patent No.: US 11,254,811 B2
(45) Date of Patent: Feb. 22, 2022

(54) POLYPROPYLENE COPOLYMERS WITH IMPROVED STIFFNESS AND IMPACT BEHAVIOUR

(71) Applicant: BOREALIS AG, Vienna (AT)

(72) Inventors: Minna Aarnio-Winterhof, Linz (AT); Markus Gahleitner, Linz (AT); Jingbo Wang, Linz (AT); Karlheinz Friedrich, Weiden am See (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/637,386

(22) PCT Filed: Aug. 23, 2018

(86) PCT No.: PCT/EP2018/072800
§ 371 (c)(1),
(2) Date: Feb. 7, 2020

(87) PCT Pub. No.: WO2019/038395
PCT Pub. Date: Feb. 28, 2019

(65) Prior Publication Data
US 2020/0207966 A1     Jul. 2, 2020

(30) Foreign Application Priority Data

Aug. 24, 2017 (EP) ..................... 17187639

(51) Int. Cl.
*C08F 210/06* (2006.01)
*C08L 23/14* (2006.01)

(52) U.S. Cl.
CPC .......... *C08L 23/142* (2013.01); *C08F 210/06* (2013.01); *C08L 2203/16* (2013.01); *C08L 2205/025* (2013.01); *C08L 2207/02* (2013.01); *C08L 2308/00* (2013.01)

(58) Field of Classification Search
None
See application file for complete search history.

(56) References Cited

U.S. PATENT DOCUMENTS 7,572,860 B2 * 8/2009 De Palo .................... B32B 1/08
525/191

FOREIGN PATENT DOCUMENTS

| CN | 1833000 A | 9/2006 |
|---|---|---|
| CN | 102056980 A | 5/2011 |
| CN | 102361928 A | 2/2012 |
| CN | 105934475 A | 9/2016 |
| CN | 105934476 A | 9/2016 |
| CN | 107075206 A | 8/2017 |
| EP | 1874838 B1 | 5/2010 |
| EP | 2075284 B1 | 5/2013 |
| EP | 2886599 A1 | 6/2015 |
| EP | 3015503 * | 5/2016 |
| EP | 3246358 A1 | 5/2016 |
| EP | 3263640 A1 | 6/2016 |
| WO | 2010/111445 A1 | 9/2010 |
| WO | 2011/144489 A1 | 11/2011 |
| WO | 2015/117948 A1 | 8/2015 |
| WO | 2015/117958 A1 | 8/2015 |
| WO | WO2017/016711 * | 2/2017 |
| WO | 2017/076933 A1 | 5/2017 |

OTHER PUBLICATIONS

Vincenzo Busico, et al., "Alk-1-ene Polymerization in the Presence of a Monocyclolopentadienyl Zirconium(IV) Acetamidinate Catalyst: Microstructural and Mechanistic Insights"; Published Manuscript; Macromolecular Rapid Communications; May 18, 2007; https://doi.org/10.1002/marc.200700098; pp. 1128-1134.
H. N. Cheng, "C NMR Analysis of Ethlene-Propylene Rubbers"; Macromolecules 1984, 17, pp. 1950-1955; Hercules ncorporated, Research Center.
Luigi Resconi, et al.; "Selectivity in Propene polymerization with Metallocene Catalysts"; Chem Rev 2000, 100; pp. 1253-1345.
Zhe Zhou, et al.; "A new decoupling method for accurate quantification of polyethylene copolymer composition and triad sequence distribution with 13C NMR"; Journal of Magnetic Resonance 187 (2007); (Revised May 4, 2007); pp. 225-233.
Wen-Jun Wang, et al.; "Structural analysis of Ethylene/Propylene Copolymers Synthesized with a Constrained Geometry Catalyst"; Macromolecules 2000, 33, pp. 1157-1162.
Applicant: Borealis AG; Indian Application No. 202017000271; Date of Filing: Mar. 1, 2020; "Polypropylene Copolymers with Improved Stiffness and Impact Behaviour"; Indian Office Action; Controller: Ragini Kumari; Oct. 29, 2020; 5 pgs.
Chinese Office Action dated Nov. 29, 2021.

\* cited by examiner

*Primary Examiner* — David J Buttner

(74) *Attorney, Agent, or Firm* — Tarolli, Sundheim, Covell & Tummino LLP

(57) ABSTRACT

The present invention is directed towards random-heterophasic propylene copolymers with a specific ratio of stiffness to impact balance and specific relation between glass transition temperature and comonomer content. The invention is further directed to articles comprising said random-heterophasic propylene copolymer and their use.

9 Claims, No Drawings

POLYPROPYLENE COPOLYMERS WITH IMPROVED STIFFNESS AND IMPACT BEHAVIOUR

The present invention is directed towards random-heterophasic propylene copolymers with a specific ratio of stiffness to impact balance and specific relation between glass transition temperature and comonomer content.

The invention is further directed to articles comprising said random-heterophasic propylene copolymer and their use.

BACKGROUND INFORMATION

There is an increasing trend in the food packaging and medical packaging industry to use plastic materials. Packaging articles like injection moulded articles or films made of random-heterophasic propylene copolymers (RAHECOs) comprising a crystalline matrix and rubber phase dispersed within said matrix are widely used in the field of food and medical packaging.

It is a continuous request by the industry for such applications to have polymers at hand that show better stiffness and better impact behaviour combined with better flowability at the same time.

Polymers with higher stiffness can be converted into articles with lower wall thickness, allowing material and energy savings. The resulting articles also exhibit better stability in steam sterilization and hot-filling.

Polymers with good impact behaviour are also desired in consumer related articles to safely keep the content even when dropped.

Good processability is required to ensure short production cycles or uniform filling of the moulds.

It is well known that the stiffness of a heterophasic propylene copolymer can be increased by reducing the overall amount of the rubber phase. But following this approach, the impact properties are impaired.

Likewise, polymers with increased flowability are known to become stiffer. Such polymers however tend to become brittle and will more likely fail in impact testing.

It is further well known, that stiffness of a heterophasic propylene copolymer can be modified by varying, i.e. reducing the comonomer content. This however may have again detrimental effect on the impact behaviour of the polymer.

One way to improve the impact properties is to increase the molecular weight of the rubber phase. This however may introduce further problems as higher molecular weight rubber can impair processability as it tends to become sticky or generates undesired deposits during conversion.

So it becomes clear that improving a specific property in the context of stiffness/impact/processing behaviour can only be accomplished on the expense of another property.

DESCRIPTION OF THE PRIOR ART

WO 2015/117948 A1 covers soft and transparent impact copolymers comprising (a) 60-87 wt.-% of a predominantly crystalline random copolymer of propylene with 3.0-5.0 wt.-% ethylene and/or a C4-C8α-olefin having a (matrix-) MFR of 3-8 g/10 min, and (b) 13-40 wt.-% of a predominantly amorphous dispersed phase consisting of a copolymer of propylene with 25-35 wt.-% of ethylene and/or a C4-C8 α-olefin; said composition being further characterised by a total MFR of 2-10 g/10 min, a content of xylene cold soluble (XS) of 16 to 50 wt.-%, an intrinsic viscosity (XS) in the range of 1.0-1.8 dl/g, a comonomer content (XS)~25-35 wt.-%. The invention is concerned with improving the balance between softness and haze.

WO 2015/117958 A1 concerns random-heterophasic copolymers (RAHECOs) which show an improved toughness/MFR relation at comparable softness and xylene solubles content. These polymers comprise (a) 60-87 wt.-% of a predominantly crystalline random copolymer of propylene with 3.0-5.0 wt.-% ethylene and/or a C4-C8 α-olefin having a (matrix-) MFR of 3-8 g/10 min, and (b) 13-40 wt.-% of a predominantly amorphous dispersed phase consisting of a copolymer of propylene with 25-35 wt.-% of ethylene and/or a C4-C8 α-olefin; said composition being further characterised by a total MFR of 0.3-20 g/10 min, a content of xylene cold soluble (XS) of 16 to 50 wt.-%, an iV(XS) in the range of 2.0-4.5 dl/g, a comonomer content (XS)~28-40 wt.-%, being produced either in the reactor or by visbreaking.

EP 16170177 describes highly transparent soft blends of a random heterophasic copolymer (Raheco) with bimodal rubber, produced by plastomer modification of standard RAHECO grades. The invention is concerned with optimizing the balance between mechanical and optical properties.

EP 16176618 describes a heterophasic random copolymer with a polypropylene random copolymer and a high amount of bimodal elastomeric propylene copolymer (B) dispersed therein. The heterophasic random copolymer comprises predominantly a bimodal elastomeric propylene copolymer (B) and a smaller fraction of a propylene random copolymer.

The invention is concerned with improving optical properties and retortability at very low leachables, especially a low C6/XCS ratio.

EP1874838 describes a propylene polymer composition comprising (A) 60-90 wt.-% of a copolymer of propylene with ethylene containing less than 2.5 wt.-% of ethylene units; and (B) 10-40 wt.-% of a copolymer of propylene comprising from 15 to 35 wt.-% of ethylene units, said polymer composition having a melt flow rate value according to ISO 1133 (230° C., 2.16 Kg) of less than 10 g/10 min. The inventive examples are further characterised by an intrinsic viscosity of at most 1.5 dl/g. The invention concerns thermoplastic polyolefin compositions having a good softness and low temperature impact properties, while retaining good optical properties.

OBJECT OF THE INVENTION

The present invention is accordingly directed at random-heterophasic propylene copolymers with improved stiffness while maintaining or even improving impact strength at a higher flow rate.

The present inventors have surprisingly identified a random-heterophasic propylene copolymer comprising a. 75.0-90.0 wt.-% of a random propylene copolymer (A) as matrix and
b. 10.0-25.0 wt.-% of a elastomeric propylene copolymer (B) being dispersed in (A), wherein the random-heterophasic propylene copolymer has at least two glass transition temperatures Tg(1) and Tg(2), wherein the first glass transition temperature Tg(1) relates to the matrix (A) while the second glass transition temperature Tg(2) relates to the dispersed elastomeric propylene copolymer (B), wherein further the second glass transition temperature fulfils the inequation (I), $$(Tg2)/(° C.) > 14.0 - (2.1*(C(XCS))/(wt.\text{-}\%) \qquad (I)$$

wherein Tg(2) is the second glass transition temperature of the random-heterophasic propylene copolymer and C(XCS)

is the comonomer content in [wt.-%] of the xylene cold soluble (XCS) fraction of the random-heterophasic propylene copolymer.

Seen from another view, the present invention is directed to a random-heterophasic propylene copolymer comprising
a. 75.0-90.0 wt.-% of a random propylene copolymer (A) as matrix and
b. 10.0-25.0 wt.-% of a elastomeric propylene copolymer (B) being dispersed in (A),
wherein the random-heterophasic propylene copolymer is characterised by a xylene soluble content determined according to ISO16152 (25° C.) in the range of 18.0-28.0 wt.-%, wherein said fraction soluble in xylene (i) is further characterised by an intrinsic viscosity (IV) in the range of 1.70-2.50 dl/g when measured in Decalin according to ISO 1628.

In a preferred embodiment, the present invention is directed to a random-heterophasic propylene copolymer comprising
75.0-90.0 wt.-% of a random propylene copolymer (A) as matrix and
10.0-25.0 wt.-% of a elastomeric propylene copolymer (B) being dispersed in (A),
wherein the random-heterophasic propylene copolymer is characterised by a xylene soluble content determined according to ISO16152 (25° C.) in the range of 18.0-28.0 wt.-%, wherein said fraction soluble in xylene (i) is further characterised by an intrinsic viscosity (IV) in the range of 1.70-2.50 dl/g when measured in Decalin according to ISO 1628 and
wherein the random-heterophasic propylene copolymer is further characterised by having at least two glass transition temperatures Tg(1) and Tg(2), wherein the first glass transition temperature Tg(1) relates to the matrix (A) while the second glass transition temperature Tg(2) relates to the dispersed elastomeric propylene copolymer (B), wherein further the second glass transition temperature fulfils the inequation (I), $$(Tg2)/(° C.) > 14.0 - (2.1*(C(XCS))/(wt.-\%) \quad (I)$$

wherein Tg(2) is the second glass transition temperature of the random-heterophasic propylene copolymer and C(XCS) is the comonomer content in [wt.-%] of the xylene cold soluble fraction (XCS) of the random-heterophasic propylene copolymer.

Seen from another view, the present invention is directed at a random-heterophasic propylene copolymer having a good relation between stiffness and impact behaviour expressed by a specific relation between the glass transition temperature of the elastomeric propylene copolymer (B), namely Tg(2), and the Charpy notched impact strength (NIS), fulfilling inequation (II) as given below:

$$(Tg2)/(° C.) + 3*NIS/(kJ/m^2) > 0 \quad (II)$$

In a further preferred alternative embodiment, the invention relates to a random-heterophasic propylene copolymer characterised by a good Mechanical Performance Index (MPI). The invention is further characterised, by the fact that the good Mechanical Performance Index is substantiated both on injection moulded as well as on film samples. Accordingly the present invention is directed to random-heterophasic propylene copolymers characterised by a good mechanical performance index for injection moulding ($MPI_{IM}$).

The present invention is further directed to random-heterophasic propylene copolymers characterised by a good mechanical performance index on films ($MPI_F$)

In a further preferred embodiment the random-heterophasic propylene copolymer of the present invention is characterised by
a. a Flexural Modulus of at least 625 MPa when measured according to ISO178 and/or
b. an Charpy notched impact Strength (NIS) of at least 14.0 kJ/m² when measured according to ISO179/1eA at +23° C. and/or
c. a Mechanical Performance in Injection Moulding ($MPI_{IM}$) of at least 1600.

A reasonable upper limit for the Flexural Modulus of the random-heterophasic propylene copolymer of the present invention is 1000 MPa. A reasonable upper limit for the Charpy notched impact Strength (NIS) of the random-heterophasic propylene copolymer of the present invention is 75 kJ/m².

In a further preferred embodiment the random-heterophasic propylene copolymer of the present invention is characterised by
a. a mean Tensile Modulus (average of TD and MD values) of at least 320 MPa when measured according to ISO527 on 50 μm cast films and/or
b. a relative penetration energy $W_{tot}$ at least 40.0 J/mm when measured according to Dyna test and/or
c. a Mechanical Performance on Films ($MPI_F$) of at least 3000.

In a special embodiment, the invention is directed to moulded articles like films or injection moulded articles comprising the random-heterophasic propylene copolymer of the present invention.

In a further preferred embodiment the invention is directed to packaging articles comprising the random-heterophasic propylene copolymer of the present invention.

The present invention is further directed to the use of the random-heterophasic propylene copolymer for producing injection moulded or extruded articles as well as packaging articles comprising the random-heterophasic propylene copolymer of the present invention.

DETAILED DESCRIPTION

Polymer

The random-heterophasic propylene copolymer according to this invention comprises a matrix (M) being a random propylene copolymer (A) and dispersed therein an elastomeric propylene copolymer (B). Thus the matrix (M) contains (finely) dispersed inclusions being not part of the matrix (M) and said inclusions contain the elastomeric propylene copolymer (B). The term inclusion indicates that the matrix (M) and the inclusion form different phases within the random-heterophasic propylene copolymer. The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Preferably, the random-heterophasic propylene copolymer according to this invention comprises as polymer components only the random propylene copolymer (A) and the elastomeric propylene copolymer (B). In other words, the random-heterophasic propylene copolymer may contain further additives but no other polymer in an amount exceeding 5.0 wt.-%, more preferably exceeding 3.0 wt.-%, like exceeding 1.0 wt.-%, based on the total random-heterophasic propylene copolymer.

One additional polymer which may be present in such low amounts is a polyethylene which is a by-reaction product obtained by the preparation of the random-heterophasic propylene copolymer. Accordingly, it is in particular appreciated that the instant random-heterophasic propylene copolymer contains only the random propylene copolymer (A), the elastomeric propylene copolymer (B) and optionally polyethylene in amounts as mentioned in this paragraph.

The random-heterophasic propylene copolymer according to this invention is featured by a moderate melt flow rate. Accordingly, the random-heterophasic propylene copolymer has a melt flow rate MFR2 (230° C./2.16 kg) in the range of 0.5 to 15.0 g/10 min, preferably in the range of 1.5 to 10.0 g/10 min, more preferably in the range of 3.0 to 8.0 g/10 min.

The random-heterophasic propylene copolymer comprises apart from propylene also comonomers. Preferably, the random-heterophasic propylene copolymer comprises apart from propylene ethylene and/or C4 to C8 α-olefins. Accordingly, the term "propylene copolymer" according to this invention is understood as a polypropylene comprising, preferably consisting of, units derivable from
(a) propylene and
(b) ethylene and/or C4 to C8 α-olefins.

Preferably, the random-heterophasic propylene copolymer according to this invention comprises, especially consists of, monomers copolymerisable with propylene from the group consisting of ethylene, 1-butene and 1-hexene. More specifically, the random-heterophasic propylene copolymer of this invention comprises—apart from propylene—units derivable from ethylene and/or 1-butene.

In a preferred embodiment, the random-heterophasic propylene copolymer according to this invention comprises units derivable from ethylene and propylene only. Still more preferably, the random propylene copolymer (A) as well as the elastomeric propylene copolymer (B) of the random-heterophasic propylene copolymer contain the same comonomers, like ethylene.

It is further preferred, that the random propylene copolymer (A) or the elastomeric propylene copolymer (B) independently of each other do not contain C8 α-olefins as comonomer.

It is especially preferred, that neither the random propylene copolymer (A) nor the elastomeric propylene copolymer (B) contains C8 α-olefins as comonomer.

Accordingly, the elastomeric propylene copolymer (B) is preferably an ethylene propylene rubber (EPR), whereas the random propylene copolymer (A) is a random ethylene propylene copolymer.

Additionally, it is appreciated that the random-heterophasic propylene copolymer preferably has a moderate total comonomer content, preferably ethylene content, which contributes to the mechanical properties, especially to the stiffness of the material. Thus, it is preferred that the total comonomer content of the random-heterophasic propylene copolymer is in the range from 7.0-11.0 wt.-%, preferably in the range from 7.5-10.5 wt.-%, more preferably in the range from 8.0-10.0 wt.-%.

The xylene cold soluble (XCS) fraction measured according to according ISO 16152 (25° C.) of the random-heterophasic propylene copolymer is in the range of 18.0-28.0 wt.-%, preferably in the range from 19.0-26.0 wt.-%, more preferably in the range from 20.0-25.0 wt.-%.

Further it is appreciated that the xylene cold soluble (XCS) fraction of the random-heterophasic propylene copolymer is specified by its intrinsic viscosity.

A low intrinsic viscosity (IV) value reflects a low weight average molecular weight. For the present invention it is appreciated that the xylene cold soluble fraction (XCS) of the random-heterophasic propylene copolymer has an intrinsic viscosity (IV) measured according to ISO1628/1 (at 135° C. in decalin) in the range of 1.70 to 2.50 dl/g, preferably in the range of 1.80 to 2.30 dl/g.

Additionally, it is preferred that the comonomer content, e.g. ethylene content, of the xylene cold soluble (XCS) fraction of the random-heterophasic propylene copolymer is in the range of 23.0-35.0 wt.-%, yet more preferably in the range of 25.0-32.0 wt.-%. The comonomers present in the xylene cold soluble (XCS) fraction are those defined above for the random propylene copolymer (A) and the elastomeric propylene copolymer (B), respectively.

In one preferred embodiment the comonomer is ethylene only.

Preferably, the random-heterophasic propylene copolymer of the present invention is thermo-mechanically stable. Accordingly, it is appreciated that the random-heterophasic propylene copolymer has a melting temperature of at least 135° C., more preferably in the range of 140 to 160° C., still more preferably in the range of 144 to 155° C.

Typically, the random-heterophasic propylene copolymer of the present invention has a rather high crystallization temperature (Tc), i.e. at least 107° C. or higher, like 109° C. more preferably in the range of 107 to 115° C., still more preferably in the range of 109 to 114° C.

The random-heterophasic propylene copolymer can be further defined by its individual components, i.e. the random propylene copolymer (A) and the elastomeric propylene copolymer (B).

The random propylene copolymer (A) comprises monomers copolymerisable with propylene, for example comonomers such as ethylene and/or C4 to C8 α-olefins, in particular ethylene and/or C4 to C6 α-olefins, e.g. 1-butene and/or 1-hexene. Preferably the random propylene copolymer (A) according to this invention comprises, especially consists of, monomers copolymerisable with propylene from the group consisting of ethylene, 1-butene and 1-hexene. More specifically the random propylene copolymer (A) of this invention comprises—apart from propylene—units derivable from ethylene and/or 1-butene. In a preferred embodiment the random propylene copolymer (A) comprises units derivable from ethylene and propylene only.

As mentioned above the random-heterophasic propylene copolymer is featured by a moderate comonomer content. Accordingly, the comonomer content of the random propylene copolymer (A) is in the range of 3.0-4.0 wt.-%, yet more preferably in the range of 3.2-3.8 wt.-%.

The random propylene copolymer (A) according to this invention has a melt flow rate MFR2 (230° C./2.16 kg) measured according to ISO 1133 in the range of 1.0 to 10.0 g/10 min, more preferably in the range of 2.0 to 8.0 g/10 min, still more preferably in the range of 3.0 to 7.0 g/10 min.

The term "random" indicates that the comonomers of the random propylene copolymer (A) are randomly distributed within the propylene copolymers. The term random is understood according to IUPAC (Glossary of basic terms in polymer science; IUPAC recommendations 1996).

The random-heterophasic propylene copolymer preferably comprises 75.0-90.0 wt.-%, preferably 77.0-89.0 wt.-%, more preferably 80.0-88.0 wt.-% of the random propylene copolymer (A), and 10.0-25.0 wt.-%, preferably 11.0-23.0 wt.-%, more preferably 12.0-20.0 wt.-% of the elastomeric propylene copolymer (B), based on the total weight of the random-heterophasic propylene copolymer.

According to on preferred embodiment, the random-heterophasic propylene copolymer preferably consists of 75.0-90.0 wt.-%, preferably 77.0-89.0 wt.-%, more preferably 80.0-88.0 wt.-% of the random propylene copolymer (A), and 10.0-25.0 wt.-%, preferably 11.0-23.0 wt.-%, more preferably 12.0-20.0 wt.-% of the elastomeric propylene copolymer (B), based on the total weight of the random-heterophasic propylene copolymer.

A further component of the random-heterophasic propylene copolymer is the elastomeric propylene copolymer (B) dispersed in the matrix (A). Concerning the comonomers used in the elastomeric propylene copolymer (B) it is referred to the information provided for the random-heterophasic propylene copolymer. Accordingly, the elastomeric propylene copolymer (B) comprises monomers copolymerisable with propylene, for example comonomers such as ethylene and/or C4 to C8 α-olefins, in particular ethylene and/or C4 to C6 α-olefins, e.g. 1-butene and/or 1-hexene.

Preferably, the elastomeric propylene copolymer (B) comprises, especially consists of, monomers copolymerisable with propylene from the group consisting of ethylene, 1-butene and 1-hexene.

More specifically the elastomeric propylene copolymer (B) comprises—apart from propylene—units derivable from ethylene and/or 1-butene. Thus, in an especially preferred embodiment the elastomeric propylene copolymer (B) comprises units derivable from ethylene and propylene only.

The comonomer content of the elastomeric propylene copolymer (B) may be in the range of 30.0 to 55.0 wt.-%, preferably in the range of 35.0 to 50.0 wt.

As mentioned above multiphase structures can be identified by the presence of at least two distinct glass transition temperatures. The higher first glass transition temperature (Tg(1)) represents the matrix whereas the lower second glass transition temperature (Tg(2)) reflects the elastomeric propylene copolymer (B) of the random-heterophasic propylene copolymer.

Accordingly, it is one requirement of the present invention, that the random-heterophasic propylene copolymer has a second glass transition temperature Tg(2) fulfilling the inequation (I), preferably the inequation (Ia), $$Tg(2)/(° C.)>14.0-[2.1*C(XCS)/(wt.-\%)] \quad (I)$$

$$Tg(2)/(° C.)>16.0-[2.1*C(XCS)/(wt.-\%)] \quad (Ia)$$

wherein Tg(2) is the second glass transition temperature of the random-heterophasic propylene copolymer;
C(XCS) is the comonomer content [in wt.-%] of the xylene cold soluble fraction (XCS) of the random-heterophasic propylene copolymer.

Preferably the second glass transition temperature Tg(2) is below −20° C., like below −35° C.

The second glass transition temperature Tg(2) may be −53.0° C. or higher, like −51.0° C. or higher, like −48° C. or higher. More preferably the second glass transition temperature Tg(2) may be in the range of −51.0 to −35° C., still more preferably in the range of −48.0 to −38.0° C.

It is further appreciated that the random-heterophasic propylene copolymer according to this invention has additionally a first glass transition temperature Tg(1) (representing the matrix (A) of the random-heterophasic propylene copolymer) in the range of −5.0 to +5.0° C., more preferably in the range of −3.0 to +3.0° C.

Accordingly the first glass transition temperature Tg(1) is above the second glass transition temperature Tg(2).

Preferably the difference between the first glass transition temperature Tg(1) and second glass transition temperature Tg(2) is at least 35 K, more preferably at least 38 K or 40 K, yet more preferably in the range of 35 to 50 K, still more preferably in the range of 38-45 K.

The random-heterophasic propylene copolymer of the present invention may be further characterised by a specific relation between the glass transition temperature of the elastomeric propylene copolymer (Tg2) and the Charpy Notched Impact Strength at +23° C. (NIS), namely:

$$(Tg2)/(° C.)+3*NIS/(kJ/m^2)>0 \quad (II)$$

wherein Tg(2) is the second glass transition temperature of the random-heterophasic propylene copolymer and
NIS denominates the Charpy Notched Impact Strength at +23° C. [kJ/m$^2$] according to ISO179/1eA.

Mechanical Properties

As described earlier, the random-heterophasic propylene copolymer of the present invention is featured by special combination of stiffness and impact behaviour.

Accordingly, the random-heterophasic propylene copolymer of the present invention may be characterised by a Flexural Modulus of at least 625 MPa up to 1000 MPa when measured according to ISO178, preferably of in the range of 625 to 850 MPa or more, such as 645 MPa to 800 MPa, like 645 MPa to 750 MPa.

The random-heterophasic propylene copolymer is further characterised by a Notched Impact Strength when determined according to ISO179/1eA at +23° C. (NIS) of at least 14.0 kJ/m$^2$ or higher, like 14.4 kJ/m$^2$ or higher.

The random-heterophasic propylene copolymer may be further characterised by a Charpy Notched Impact Strength when determined according to ISO179/1eA at +23° C. (NIS) of 75.0 kJ/m$^2$ or lower, like up to 50.0 kJ/m$^2$, like up to 35.0 kJ/m$^2$.

Preferably, the Charpy Notched Impact Strength when determined according to ISO179/1eA at +23° C. (NIS) may be in the range of 14.0 to 75.0 kJ/m$^2$, like in the range of 14.0-35.0 kJ/m$^2$.

The random-heterophasic propylene copolymer of the present invention is further characterised by a specific mechanical performance Index on Injection moulded articles (MPI$_{IM}$).

The MPI$_{IM}$ equals the product of Flexural Modulus [MPa] multiplied with Charpy notched Impact Strength at +23° C. [kJ/m$^2$] (both determined on injection moulded specimen) and divided by the Meltflow Rate 230/2.16 [g/10 min]:

$$MPI_{IM} = \frac{(\text{Flex Modulus [MPa]}) * NIS\left[\frac{kJ}{m^2}\right]}{MFR230/2.16[g/10 \text{ min}]} \quad (III)$$

The Mechanical Performance Index on Injection moulded articles (MPI$_{IM}$) of the random-heterophasic propylene copolymer according to the present invention may be at least 1600, like 1850 or 2000 or higher.

Preferably, it may be in the range of 1600-4000, like 1850-3500, such as 2000 to 3000.

The random-heterophasic propylene copolymer is of the present invention may be further characterised by a Flexural Modulus of at least 625 MPa when measured according to ISO178 and/or an Charpy notched impact Strength (NIS) of at least 14.0 kJ/m² when measured according to ISO179/1eA at +23° C. and/or
a Mechanical Performance in Injection Moulding (MPI$_{IM}$) of at least 1600.

Preferably random-heterophasic propylene copolymer of the present invention may be characterised by a Flexural Modulus of at least 625 MPa when measured according to ISO178 and
an Charpy notched impact Strength (NIS) of at least 14.0 kJ/m² when measured according to ISO179/1eA at +23° C. and
a Mechanical Performance in Injection Moulding (MPI$_{IM}$) of at least 1600.

The random-heterophasic propylene copolymer of the present invention is very suitable for producing films with well-defined stiffness/impact behaviour.

Accordingly, the random-heterophasic propylene copolymer of the present invention may be characterised by a Tensile Modulus measured in transverse direction (TD) of at least 320 MPa when measured on a 50 μm Cast film according to ISO527.

The random-heterophasic propylene copolymer may further have a Tensile Modulus (TD) of up to 800 MPa when measured on a 50 μm cast film.

Preferably, the tensile Modulus (TD) may be in the range of 320-800, like 350-600 MPa, such as in the range of 380-500 MPa.

Accordingly, the random-heterophasic propylene copolymer of the present invention may be characterised by a Tensile Modulus measured in machine direction (MD) of at least 340 MPa when measured on a 50 μm Cast film according to ISO527.

The random-heterophasic propylene copolymer may further have a Tensile Modulus (MD) of up to 800 MPa when measured on a 50 μm cast film.

Preferably, the tensile Modulus (MD) may be in the range of 340-800 MPa, like 340-600 MPa, such as in the range of 350-500 MPa.

The random-heterophasic propylene copolymer is further characterised by good relative total penetration energy (W$_{tot}$). The relative penetration energy W$_{tot}$ (given in [J/mm]) indicates the energy per mm thickness that a film can absorb before it breaks and is determined according to Dynatest at +23° C.

Said penetration energy (W$_{tot}$) may be at least 40.0 J/mm or higher, such as at least 44.0 J/mm, such as at least 48.0 J/mm or higher.

The relative penetration energy (W$_{tot}$) may be up to 100 J/mm, like up to 80 J/mm, such as up to 60 J/mm.

Preferably, the relative penetration energy (W$_{tot}$) may be in the range of 40.0-100 J/mm, such as 45.0-80.0 J/mm, like 48.0-60.0 J/mm.

The random-heterophasic propylene copolymer is further featured by a specific Mechanical performance Index on Films (MPI$_F$).

The mechanical performance index is determined by multiplying the mean value of the tensile Modulus in machine and transversal direction of a 50 μm cast film with the Dynatest of said 50 μm cast film determined at +23° C. [J/mm] and divided by the Meltflow Rate (MFR 230/2.16) [g/10 min]:

$$MPI_F = \frac{\left(\text{Tensile Modulus}\frac{TD+MD}{2}[\text{MPa}]\right) * \text{Dynatest}\left[\frac{J}{mm}\right]}{MFR230/2.16[\text{g/10 min}]} \quad (IV)$$

The Mechanical Performance Index on films (MPI$_F$) of the random-heterophasic propylene copolymer according to the present invention may be at least 3000, or higher, such as 3500 or higher, like 3800 or higher, such as 4000 or higher.

The MPI$_F$ may be up to 7000, like up to 6000, such as up to 5000, like up to 4500.

The MPI$_F$ my further be in the range of 3000-7000, like 3500 to 6000, such as 3800 to 5000, preferably 4000-4500.

Preferably, the random-heterophasic propylene copolymer of the present invention can be characterised by a Tensile Modulus (TD) of at least 320 MPa and/or a relative penetration energy (W$_{tot}$) of at least 40.0 J/mm and/or a Mechanical performance Index on films (MPI$_F$) of at least 3000.

It is especially preferred if the random-heterophasic propylene copolymer of the present invention can be characterised by a Tensile Modulus (TD) of at least 320 MPa and a relative penetration energy (W$_{tot}$) of at least 40.0 J/mm and a Mechanical performance Index on films (MPI$_F$) of at least 3000.

The random-heterophasic propylene copolymer as defined in the instant invention may contain up to 5.0 wt.-% additives, like nucleating agents and antioxidants, as well as slip agents and antiblocking agents. Preferably the additive content is below 3.0 wt.-%, like below 1.0 wt.-%.

It is understood within this invention, that the random-heterophasic propylene copolymer may contain up to 5.0 wt.-% of additives as defined above even in case the composition or parts of the compositions are defined via the wording "consisting of".

Articles

In special embodiment the present invention envisages injection moulded articles, e.g. packaging articles made out of the random-heterophasic polypropylene composition of the present invention.

In a further special embodiment the present invention envisages articles like packaging articles comprising injection moulded articles comprising the random-heterophasic polypropylene composition of the present invention.

In a further special embodiment the present invention envisages extruded articles, e.g. films, sheets, e.g. sheets for thermoforming processes, tapes, bags or pouches made out of the random-heterophasic polypropylene composition of the present invention.

In still a further special embodiment the present invention envisages articles like packaging articles comprising extruded articles comprising the random-heterophasic polypropylene composition of the present invention.

In a further special embodiment the present invention envisages the use of the random-heterophasic propylene copolymer of the present invention for producing injection moulded or extruded articles.

Alternatively, the present invention envisages the use of the random-heterophasic propylene copolymer of the present invention for producing packaging articles.

Especially preferred are packaging articles like ampoules, lids, cups, beakers, trays, etc.

In another further special embodiment the present invention envisages the use of such articles comprising the random-heterophasic polypropylene copolymer of the present invention for packaging or thermoforming processes, preferably for producing alimentary or medical packaging.

In another further special embodiment the present invention envisages the use of such extruded articles comprising the random-heterophasic polypropylene copolymer of the present invention for producing packaging articles, like packaging articles used for alimentary or medical applications.

Films comprising the random-heterophasic polypropylene composition of the present invention can be produced with several known conversion techniques, such as extrusion via blown or cast film technology, wherein both blown and cast films are equally preferred.

Films according to the present invention may be subjected to post-treatment processes, e.g. lamination or orientation processes or surface treatments like corona treatment. Orientation processes can be mono-axial (MDO) or bi-axial, wherein monoaxial orientation or biaxial orientation are equally preferred.

The cast or blown films according to the present invention can have a thickness in the range at most 80 μm like 70 or 60 or 55 μm or below.

Preferred are films having a thickness of 10 μm or higher, such at least 15 μm, 20 μm or higher such as 25 μm or higher.

Very preferred are films having film thicknesses of 10-55 μm, such as 15-50 μm Very especially preferred are films having a thickness of 10-40 μm, such as 15-35 μm. Equally preferred are films having a thickness of 30-60 μm, such as 35-55 μm, like 45-55 μm.

Cast sheets (as e.g. used for thermoforming processes) comprising the random-heterophasic polypropylene composition of the present invention can have a thickness of 100-500 μm, such as 150-400 μm or 200-350 μm.

Both blown and cast films as well as sheets according to the present invention may have mono- or multilayer structures, comprising one or more layers, like two, three or five layers, even up to seven, up to 9 or up to 12 layers.

In multilayer structures the random-heterophasic polypropylene composition according to the present invention may be contained by at least one of the layers, or by more than one layer, like two or three layers of the multilayer film. It may be also comprised by all layers of the multilayer film.

It is within the scope of the present invention, that a monolayer structure may comprise 1-100 wt.-% of the the random-heterophasic polypropylene composition according to the present invention. It is preferred, that such monolayer film comprise 10-90 wt.-%, such as 30-70 wt.-%, or like 40-60 wt.-% of the random-heterophasic propylene copolymer of the present invention.

The present invention will now be described in further detail by the examples provided below:

EXAMPLES

Measuring Methods
Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.
Density Density is measured according to ISO1183. Sample preparation is done by compression moulding in accordance with ISO 1873.
Xylene Soluble Fraction and Amorphous Phase The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached.

The xylene soluble fraction (percent) can then be determined as follows:

$$XCS\ \% = (100 \times m1 \times v0)/(m0 \times v1) \tag{V}$$

wherein $m_0$ designates the initial polymer amount (grams), $m_1$ defines the weight of residue (grams), $v_0$ defines the initial volume (millilitre) and $v_1$ defines the volume of the analysed sample (millilitre).

The fraction insoluble in p-xylene at 25° C. (XCU) is then equal to 100%–XCS %. The solution from the second 100 ml flask was treated with 200 ml of acetone under vigorous stirring. The precipitate was filtered and dried in a vacuum oven at 90° C. This solution can be employed in order to determine the amorphous part (AM) of the polymer (wt.-%) using the following equation:

$$AM = (100 \times 1 \times v0)/(m0 \times v1) \tag{VI}$$

wherein $m_0$ designates the initial polymer amount (g), $m_1$ defines the weight of residue (g), $v_0$ defines the initial volume (ml) and $v_1$ defines the volume of the analysed sample (ml).
Intrinsic Viscosity (IV of XCS)

Intrinisic viscosity (IV of XCS) is measured according to DIN ISO 1628/1, October 1999 (in Decalin at 135° C.) on the xylene soluble fraction (XCS).
Flexural Modulus The flexural modulus was determined in 3-point-bending at +23° C. according to ISO 178 on 80×10×4 mm³ test bars injection moulded in line with EN ISO 1873-2.
Notched Impact Strength (NIS):

The Charpy notched impact strength (NIS) was measured according to ISO 179 1eA at +23° C., using injection moulded bar test specimens of 80×10×4 mm³ prepared in accordance with EN ISO 1873-2.
Mechanical Performance Index MPI The mechanical performance index for injection moulding ($MPI_{IM}$) equals the product of Flexural Modulus (ISO178) [MPa] multiplied with Charpy notched Impact Strength at +23° C. [kJ/m²] (both determined on injection moulded specimen) and divided by the Meltflow Rate 230/2.16 [g/10 min]:

$$MPI_{IM} = \frac{(\text{Flex Modulus [MPa]}) * NIS\left[\frac{kJ}{m^2}\right]}{MFR230/2.16[g/10\ min]} \tag{III}$$

Tensile Test on Films

Tensile tests according to ISO 527 at a temperature of +23° C. were carried out on 10 mm wide strips cut in machine direction (MD) and in transverse direction (TD) from 50 μm thick cast films.
Dyna Test The impact strength of films is determined by the Dynatest method according to ISO7725-2 at +23° C. on cast films of 50 μm thickness produced on a monolayer cast film line with a melt temperature of 220° C. and a chill roll temperature of 20° C. with a thickness of 50 μm.

The value $W_{break}$ [J/mm] represents the relative total penetration energy per mm thickness that a film can absorb before it breaks divided by the film thickness. The higher this value the tougher the material.

Mechanical Performance on Films (MPI$_F$)

The mechanical performance index is determined by multiplying the mean value of the tensile Modulus in machine and transversal direction with the Dynatest determined at +23° C. [J/mm] and divided by the Meltflow Rate 230/2.16 [g/10 min]:

$$MPI_F = \frac{\left(\text{Tensile Modulus}\frac{TD+MD}{2}[\text{MPa}]\right) * \text{Dynatest}\left[\frac{J}{\text{mm}}\right]}{MFR230/2.16[\text{g}/10\ \text{min}]} \quad (IV)$$

Glass Transition Temperature (Tg)

The glass transition temperature (Tg) is determined by dynamic mechanical thermal analysis according to ISO 6721-7. The measurements are done in torsion mode on compression moulded samples (40×10×1 mm$^3$) between −100° C. and +150° C. with a heating rate of 2° C./min and a frequency of 1 Hz.

Differential Scanning Calorimetry (DSC)

Differential scanning calorimetry (DSC) analysis, melting temperature (T$_m$) and melt enthalpy (H$_m$), crystallization temperature (T$_c$), and heat of crystallization (H$_c$, H$_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (T$_c$) and heat of crystallization (H$_c$) are determined from the cooling step, while melting temperature (T$_m$) and melt enthalpy (Hm) are determined from the second heating step.

Throughout the patent the term Tc or (Tcr) is understood as Peak temperature of crystallization as determined by DSC at a cooling rate of 10 K/min.

Description of Microstructure Quantification by NMR Spectroscopy

Quantitative nuclear-magnetic resonance (NMR) spectroscopy was used to quantify the comonomer content and comonomer sequence distribution of the polymers. Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d2) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E\ [\text{mol \%}]=100*fE$$

The weight percent comonomer incorporation was calculated from the mole fraction:

$$E\ [\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The relative content of isolated to block ethylene incorporation was calculated from the triad sequence distribution using the following relationship (equation (VII)):

$$I(E) = \frac{fPEP}{(fEEE+fPEE+fPEP)} \times 100 \quad (VII)$$

wherein

I(E) is the relative content of isolated to block ethylene sequences [in %];

fPEP is the mol fraction of propylene/ethylene/propylene sequences (PEP) in the sample;

fPEE is the mol fraction of propylene/ethylene/ethylene sequences (PEE) and of ethylene/ethylene/propylene sequences (EEP) in the sample;

fEEE is the mol fraction of ethylene/ethylene/ethylene sequences (EEE) in the sample.

Material Description

Catalyst for IE1 and IE2

The catalyst used in the polymerisation processes was the commercial ZN180 of Basell with triethyl-aluminium (TEA) as co-catalyst and dicyclo pentyl dimethoxy silane (donor D) as donor.

The Al/donor ratio was 5 mol/mol, and the Al/Ti ratio was 200 mol/mol. A Borstar PP pilot plant comprised of a stirred-tank prepolymerisation reactor (R1), a liquid-bulk loop reactor (R2) and three gas phase reactors (R3 to R5) was used for the main polymerisation.

Catalyst for CE 1 to CE4

The catalyst system used was a Ziegler Natta catalyst system as disclosed in WO2015/117948 and comprising an non-phthalate based internal donor.

The resulting polymer powders were compounded in a co-rotating twin-screw extruder Coperion ZSK 57 at 220° C. with 0.2 wt.-% of Irganox B225 (1:1-blend of Irganox 1010 (Pentaerythrityltetrakis(3-(3', 5'-di-tert.butyl-4-hydroxy-toluyl)-propionate and tris (2,4-di-t-butylphenyl) phosphate) phosphite) of BASF AG, Germany) and 0.1 wt.-% calcium stearate.

Cast Film Production

Cast films of the inventive and comparative examples were produced on a Barmag CAST-Coex pilot line, equipped with an extruder of 60 mm diameter and an L/D ratio of 30. A coathanger die with a die width of 800 mm and a die gap of 0.5 mm was used.

The 50 μm films were produced in cast mode with an output of 60 kg/h, a line speed of 30 m/min and a melt temperature of 239° C.

Roll settings: $1^{st}$ roll: diameter 400 mm and 15° C.; $2^{nd}$ roll: diameter 250 mm and 25° C.

Electric pinning via electrostatic charging was applied.

TABLE 1

| | | | | | | | |
|---|---|---|---|---|---|---|---|
| | | \multicolumn{7}{c}{Polymerisation Data} | | | | | | |
| | Unit | IE1 | IE2 | CE1 | CE2 | CE3 | CE4 |
| Catalyst | | ZN180 | ZN180 | non-phthalate | non-phthalate | non-phthalate | non-phthalate |
| Prepolymerisation | | | | | | | |
| TEAL/Ti | mol/mol | 353 | 385 | 302 | 220 | 215 | 210 |
| TEAL/donor | mol/mol | 14.8 | 14.8 | 7.5 | 6.1 | 6.2 | 7.0 |
| Temperature | ° C. | 20 | 20 | 20 | 20 | 20 | 20 |
| res. time | h | 0.30 | 0.30 | 0.25 | 0.25 | 0.25 | 0.38 |
| Loop | | | | | | | |
| Temperature | ° C. | 70 | 70 | 70 | 70 | 70 | 70 |
| Pressure | kPa | 5400 | 5400 | 5200 | 5200 | 5200 | 5000 |
| Split | % | 40 | 42 | 26 | 33 | 34 | 35 |
| H2/C3 ratio | mol/kmol | 1.44 | 1.42 | 0.6 | 0.5 | 0.5 | 1.7 |
| C2/C3 ratio | mol/kmol | 5.1 | 5.2 | 4.7 | 5.7 | 5.7 | 4.5 |
| MFR2 | g/10 min | 3.7 | 3.7 | 3.9 | 4.0 | 4.2 | 8 |
| XCS | wt.-% | 8.5 | 8.5 | 4.8 | 9.8 | 9.6 | 6.5 |
| C2 content | wt.-% | 2.9 | 2.9 | 2.3 | 3.0 | 2.7 | 2.5 |
| GPR 1 | | | | | | | |
| Temperature | ° C. | 80 | 80 | 80 | 80 | 80 | 80 |
| Pressure | kPa | 2500 | 2500 | 2001 | 2500 | 2500 | 2800 |
| Split | % | 47 | 43 | 61 | 54 | 54 | 52 |
| H2/C3 ratio | mol/kmol | 9.1 | 9.1 | 9.0 | 7.8 | 6.2 | 21.5 |
| C2/C3 ratio | mol/kmol | 23.3 | 23.6 | 35.0 | 26.3 | 26.3 | 28.1 |
| MFR2 | g/10 min | 4.3 | 4.3 | 3.5 | 6.3 | 3.5 | 8 |
| XCS | wt.-% | 8.6 | 8.6 | 7.1 | 8.1 | 8.4 | 7.5 |
| C2 content | wt.-% | 3.6 | 3.6 | 3.7 | 4.1 | 3.7 | 4.0 |
| GPR 2 | | | | | | | |
| Temperature | ° C. | 75 | 75 | 75 | 75 | 75 | 75 |
| Pressure | kPa | 2500 | 2500 | 2600 | 2600 | 2600 | 2600 |
| Split | % | 13 | 15 | 13 | 13 | 12 | 13 |
| C2/C3 ratio | mol/kmol | 309 | 307 | 494 | 555 | 537 | 490 |
| H2/C2 ratio | mol/kmol | 179 | 203 | 516 | 502 | 470 | 530 |
| MFR2 | g/10 min | 4.0 | 4.0 | 4.1 | 4.9 | 3.8 | 7 |
| XCS | wt.-% | 20.5 | 22.6 | 19.7 | 20.5 | 19.8 | 20 |
| IV (XCS) | dl/g | 1.84 | 1.73 | 1.47 | 1.39 | 1.59 | 1.5 |
| C2 (XCS) | Wt.-% | 27.6 | 27.5 | 26.8 | 29.6 | 28.0 | 31.0 |
| Total C2 content | wt.-% | 8.8 | 8.7 | 8.0 | 9.2 | 8.7 | 8.0 |

TABLE 2

Analytical Properties of the Inventive Examples

|  |  | IE1 | IE2 | CE1 | CE2 | CE3 | CE4 |
|---|---|---|---|---|---|---|---|
| MFR 230° C./2.16kg | g/10 min | 4.6 | 4.6 | 4.1 | 4.9 | 4.6 | 7.0 |
| C2 total (NMR) | wt.-% | 8.8 | 8.7 | 8.0 | 9.2 | 8.7 | 8.0 |
| Triad sequence distribution of RAHECO |  |  |  |  |  |  |  |
| EEE | mol % | 3.66 | 3.58 | 3.33 | 3.01 | 2.87 | — |
| EEP | mol % | 3.97 | 4.06 | 4.14 | 4.13 | 4.15 | — |
| PEP | mol % | 4.91 | 5.00 | 4.76 | 5.04 | 5.36 | — |
| I(E) | % | 39.2 | 39.6 | 38.9 | 43.3 | 43.3 | — |
| XCS | wt.-% | 22.8 | 22.6 | 19.66 | 20.5 | 19.4 | 20.0 |
| IV/XCS | dl/g | 1.84 | 1.73 | 1.47 | 1.39 | 1.59 | 1.5 |
| C2 XCS (NMR) | Wt.-% | 27.6 | 27.5 | 26.8 | 29.6 | 28.0 | 31.0 |
| Triad sequence distribution of XCS: |  |  |  |  |  |  |  |
| EEE | mol % | 10.50 | 10.40 | 9.96 | 12.65 | 10.54 | — |
| EEP | mol % | 14.51 | 14.61 | 15.21 | 16.05 | 16.48 | — |
| PEP | mol % | 11.62 | 11.63 | 10.45 | 11.66 | 11.69 | — |
| I(E) | % | 31.7 | 31.7 | 29.3 | 28.9 | 30.2 | — |
| Tc | ° C. | 112 | 111 | 105 | 104 | 103 | — |
| Tm1 | ° C. | 147 | 147 | 144 | 142 | 141 | — |
| Tm2 | ° C. | — | — | 112 | 116 | 120 | — |
| Hm1 | J/g | 69.4 | 66.8 | 70.8 | 79.8 | 78.0 | — |
| Hm2 | J/g | — | — | 0.17 | 0.3 | 0.58 | — |
| Tg1 (PP-R, A) | ° C. | 0.4 | 0.4 | −5.1 | −4.0 | −4.1 | −4.0 |
| Tg2 (EPR, B) | ° C. | −41.6 | −41.6 | −52.4 | −56 | −54.1 | −54.0 |

TABLE 3

Mechanical Properties of the Inventive Examples

|  |  | IE1 | IE2 | CE1 | CE2 | CE3 | CE4 |
|---|---|---|---|---|---|---|---|
| MFR 230° C./2.16kg | g/10 min | 4.6 | 4.6 | 4.1 | 4.9 | 4.6 | 7.0 |
| C2 XCS (NMR) | wt.-% | 27.6 | 27.5 | 26.8 | 29.6 | 28.0 | 31.0 |
| Tg2 (EPR, B) | ° C. | −41.6 | −41.6 | −52.4 | −56 | −54.1 | −54.0 |
| Injection Moulded samples: |  |  |  |  |  |  |  |
| Charpy NIS | kJ/m$^2$ | 14.5 | 15.7 | 14.1 | 13.7 | 11.4 | — |
| Flexural modulus | MPa | 669 | 656 | 608 | 561 | 576 | — |
| MPI$_{im}$ | — | 2109 | 2239 | 2092 | 1569 | 1427 | — |
| Film properties (Coex 50 um) |  |  |  |  |  |  |  |
| Tensile mod. TD | MPa | 399 | 392 | 368 | 290 | 301 | — |
| Tensile mod. MD | MPa | 357 | 356 | 330 | 322 | 340 | — |
| Mean Tensile Modulus (TD+MD)/2 | MPa | 378 | 374 | 349 | 306 | 320 | — |
| Dynatest (+23° C.) | J/mm | 51.0 | 51.8 | 35.6 | 59.7 | 52.2 | — |
| MPI$_F$ |  | 4191 | 4212 | 3030 | 3728 | 3637 | — |
| Tg2 > 14.0 − 2.1*C(XCS[wt.-%]) |  | −44.0 | −43.8 | −50.0 | −54.3 | −52.2 | −51.1 |
| Tg2 > 16.0 − 2.1*C(XCS[wt.-%]) |  | −42.0 | −41.8 | −48.0 | −52.3 | −50.2 | −49.1 |
| Tg2 + 3*NIS > 0 |  | 0.9 | 4.7 | −7.04 | −12.7 | −17.4 | — |

The data Table 2 and 3 above show clearly, that the random-heterophasic propylene copolymer exemplified in the inventive examples has good stiffness impact balance, good Mechanical Performance index both on Injection moulded specimen as well on films. It is further shown, that the random-heterophasic propylene copolymer of the present invention has a very specific relation between glass transition temperature of the elastomeric propylene copolymer (Tg(2)) and both the comonomer content and the Charpy Notched impact strength.

The data provided show that the object of the present invention is clearly fulfilled.

The invention claimed is:

1. Random-heterophasic propylene copolymer comprising:
   a. 75.0-90.0 wt. % of a random propylene copolymer (A) as matrix, wherein the random propylene copolymer (A) comprises ethylene and/or C4 to C8 α-olefin as comonomers and is characterized by a comonomer content in the range of 3.2 to 4.0 wt. %, and
   b. 10.0-25.0 wt. % of a elastomeric propylene copolymer (B) being dispersed in (A),
   wherein the random-heterophasic propylene copolymer has at least two glass transition temperatures Tg(1) and Tg(2), wherein the first glass transition temperature Tg(1) relates to the matrix (A) while the second glass transition temperature Tg(2) relates to the dispersed elastomeric propylene copolymer (B), wherein further the second glass transition temperature fulfils the inequation (I), $$(Tg2)/(° C.) > 14.0 − [2.1*(C(XCS))/(wt.-\%)] \quad (I)$$

wherein Tg(2) is the second glass transition temperature of the random-heterophasic propylene copolymer and C(XCS) is the comonomer content in [wt. %] of the xylene cold soluble fraction (XCS) of the random-heterophasic propylene copolymer, wherein the second glass transition temperature and the Charpy notched impact strength fulfil the inequation (II)

$$(Tg2)/(°C.)+3*NIS/(kJ/m^2)>0 \tag{II}$$

wherein Tg(2) is the second glass transition temperature of the random-heterophasic propylene copolymer and NIS is the Charpy Notched Impact Strength determined according to ISO179/1eA at +23° C.;

wherein the random-heterophasic propylene copolymer has a xylene soluble content determined according to ISO 16152 (25° C.) in the range of 18.0-28.0 wt. %, wherein the fraction soluble in xylene (i) has an intrinsic viscosity (IV) in the range of 1.70-2.50 dl/g when measured according to ISO 1628; and a Flexural Modulus in the range of 625 MPa to 1000 MPa when measured according to ISO 178.

2. Random-heterophasic propylene copolymer according to claim 1, having a comonomer content in the range of 7.0-11.0 wt. %.

3. Random-heterophasic propylene copolymer according to claim 1, wherein the fraction soluble in xylene (ii) has a comonomer content (C(XCS)) of 23.0-35.0 wt. %.

4. Random-heterophasic propylene copolymer according to claim 1, having a crystallisation temperature (Tc) of at least 107° C.

5. Random-heterophasic propylene copolymer according to claim 1, having a melting temperature of at least 135° C.

6. Random-heterophasic propylene copolymer according to claim 1, having a Melt Flow Rate 230/2.16, determined according to ISO1133, of 0.5-15.0 g/10 min.

7. Random-heterophasic propylene copolymer according to claim 1, wherein the random-heterophasic propylene copolymer has:
   a. an Charpy notched impact Strength (NIS) of at least 14.0 kJ/m² when measured according to ISO179/1eA at +23° C. and/or
   b. a Mechanical Performance Index in Injection Moulding ($MPI_{IM}$) of at least 1600.

8. Random-heterophasic propylene copolymer according to claim 1, wherein the random-heterophasic propylene copolymer is characterized by having:
   a. a Tensile Modulus of at least 320 MPa when measured according to ISO527 on 50 μm cast films in transverse direction (TD) and/or
   b. a relative penetration energy $W_{tot}$ of at least 40.0 J/mm when measured according to Dyna test +23° C.) and/or
   c. a Mechanical Performance Index on Films ($MPI_F$) of at least 3000.

9. Article comprising the random-heterophasic propylene copolymer according to claim 1.

* * * * *